US012783528B2

(12) United States Patent
Sankaranarayanan et al.

(10) Patent No.: US 12,783,528 B2
(45) Date of Patent: Nov. 3, 2026

(54) SYSTEMS AND METHODS FOR GROUNDED GENERATION IN NETWORK TROUBLESHOOTING AI BOTS

(71) Applicant: Verizon Patent and Licensing Inc., Basking Ridge, NJ (US)

(72) Inventors: Gopalakrishnan Sankaranarayanan, Tamil Nadu (IN); Satish Babu Seela, Farmers Branch, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 18/912,824

(22) Filed: Oct. 11, 2024

(65) Prior Publication Data

US 2026/0127183 A1 May 7, 2026

(51) Int. Cl.
*G06F 16/2457* (2019.01)

(52) U.S. Cl.
CPC .. *G06F 16/24578* (2019.01); *G06F 16/24575* (2019.01)

(58) Field of Classification Search
CPC ......... G06F 16/24578; G06F 16/24575; G06F 16/90332; G06F 16/9535; G06F 16/3329
See application file for complete search history.

(56) References Cited

U.S. PATENT DOCUMENTS

| | | | | |
|---|---|---|---|---|
| 11,797,939 | B2 * | 10/2023 | Bikumala | G06F 16/3329 |
| 11,922,942 | B1 * | 3/2024 | Kilinc | G10L 15/26 |
| 2024/0412720 | A1 * | 12/2024 | Vasylyev | G06F 16/90332 |
| 2025/0061307 | A1 * | 2/2025 | Tran | G06N 3/045 |
| 2025/0061344 | A1 * | 2/2025 | Haddad | G06N 5/022 |
| 2025/0298988 | A1 * | 9/2025 | Buchanan | G06F 40/35 |
| 2025/0384305 | A1 * | 12/2025 | Sasidharan | G06N 5/022 |

* cited by examiner

*Primary Examiner* — Dangelino N Gortayo

(57) ABSTRACT

Systems and methods improve accuracy for retrieving relevant content from a domain knowledgebase. A network device obtains, in response to a query, an initial population of retrieval strategies for retrieving relevant content from the domain knowledgebase. The network device retrieves first documents from the domain knowledgebase based on each retrieval strategy and selects first top-performing strategies from the initial population based on scoring of the retrieved first documents. The network device generates an updated population including the first top-performing strategies and mutant retrieval strategies derived from the selected first top-performing strategies and retrieves second documents from the domain knowledgebase based on each retrieval strategy of the retrieval strategies. The network device selects second top-performing strategies from the updated population based on a scoring of the retrieved second documents and provides the one of the second top-performing strategies to a large language model (LLM) for responding to the query.

20 Claims, 8 Drawing Sheets

SYSTEMS AND METHODS FOR GROUNDED GENERATION IN NETWORK TROUBLESHOOTING AI BOTS

BACKGROUND

Service providers, organizations, or other types of entities or businesses may provide customer service centers, call centers, help desks, tools, and/or other kinds of platforms, for example, to enable a user to resolve an issue or problem. A significant volume of contact or use of these resources may relate to known and repetitive issues. As such, these resources may not be optimally utilized. For example, the user may be able to solve a given problem by a knowledge article or through a guided self-help measure.

Generative artificial intelligence (AI) systems perform tasks and generate new content based on user input applied to large datasets. Applying Generative AI to enterprise applications with guardrails is a common problem faced today across enterprises. When it comes to Large Language Models (LLMs), the training of the models happens with various sources of world knowledge. The appropriate dataset selection can significantly affect the performance and utility of generative AI models.

DETAILED DESCRIPTION

The following detailed description refers to the accompanying drawings. The same reference numbers in different drawings may identify the same or similar elements. Also, the following detailed description does not limit the invention.

Retrieval-Augmented Generation (RAG) is a guided method to leverage specific knowledge sources of the enterprise along with the power of Large Language Models (LLMs) to create Artificial Intelligence (AI) systems/bots. As part of RAG process, retrieving the relevant content from a domain knowledgebase is a critical component. Retrieval accuracy plays a crucial role in the final result of the RAG pattern leveraging LLMs.

A majority of the Generative AI applications use different techniques like vector databases where data is stored in a chunked format and retrieved as a set of chunks, graph format where the data is retrieved using entities, and relationship methods. Today there are multiple techniques to retrieve data for use with RAG. In some cases, advanced techniques are used, such as BM25 (Best Matching 25) and others, to improve retrieval accuracy. The evaluation of retrieval accuracy from the given corpus is heavily dependent on statistical nearest distance algorithms or search algorithms. These advanced RAG techniques for retrieval robustness rely on leveraging LLM calls, which is an expensive operation, or reranking, which is a high compute operation. A hybrid approach is needed that is cost effective and leverages minimal compute resources.

Systems and methods described herein provide a retrieval optimization system to improve the overall robustness of content retrieval, complementing existing retrieval sources like vector databases and graph databases. According to an embodiment, the retrieval optimization system may be implemented in a service desk or product support environment and/or context that uses Generative AI applications. According to other exemplary embodiments, the retrieval optimization system may be implemented in other types of environments and/or contexts in which content recommendation may be suited.

Implementations described herein provide an extension from a Genetic Algorithm for chromosome analysis. The techniques leveraged in selection of candidates from a complex pool may be applied to retrieval problems encountered in Generative AI applications.

Figure 1:
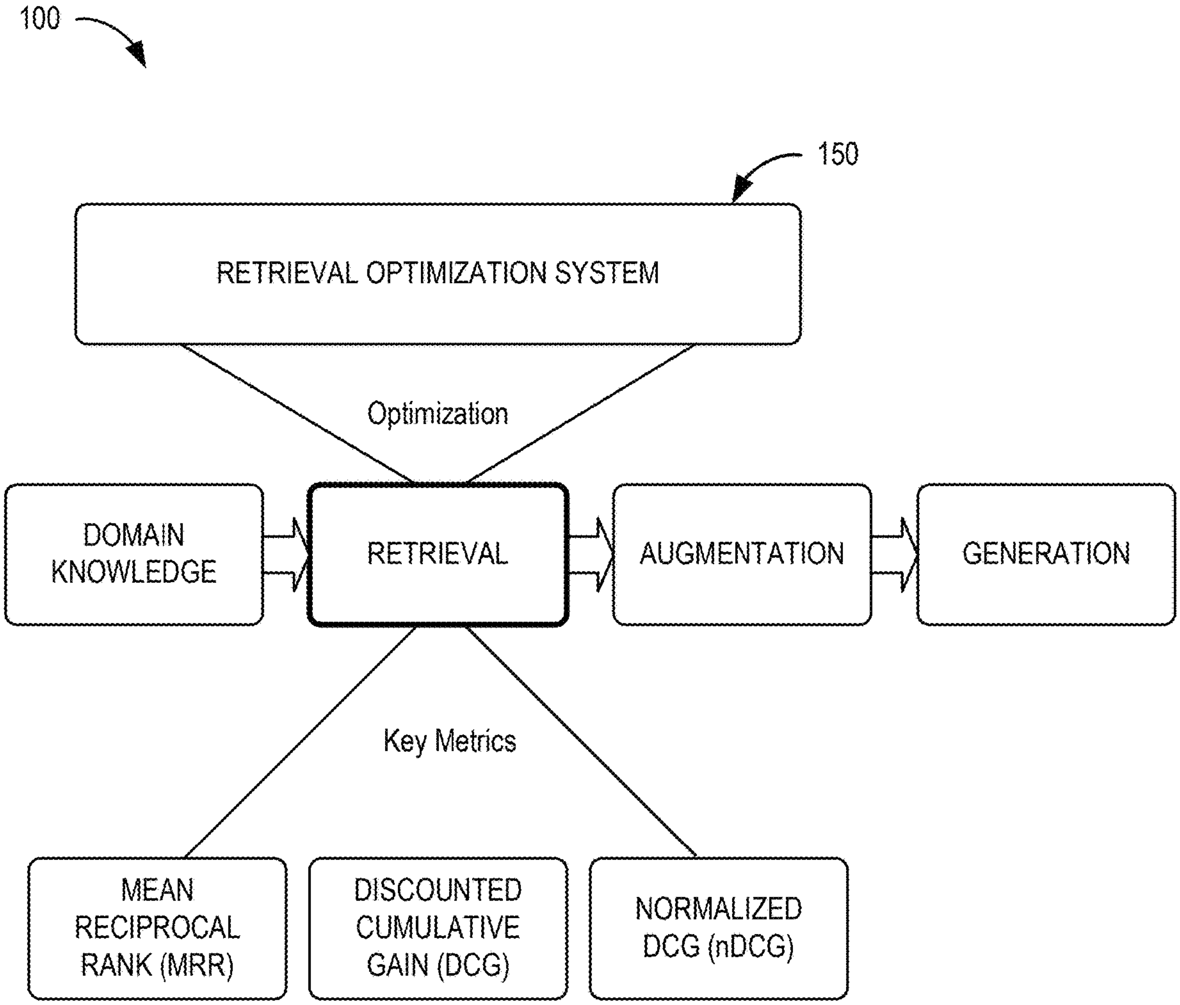
FIG. 1 is a diagram illustrating concepts described herein.

FIG. 1 illustrates concepts described herein. As shown in FIG. 1, a conventional RAG process includes retrieval from a domain knowledge data set, followed by augmentation, and generation. Typically, in the retrieval process, a user query is converted to a vector representation and matched with vector databases from the domain knowledge data set. Next, the RAG model augments the user input by adding the relevant retrieved data in context and passes the augmented input to an LLM. The LLM combines the retrieved words and its own response to the user query into a final answer it presents to the user.

According to implementations described herein, measurement metrics for effective retrieval may include a mean reciprocal rank (MRR), discounted cumulative gain (DCG), and normalized DCG (NDCG). These metrics, also referred to herein as candidate model feedback, may be used to evaluate and select a set of best candidate retrieval strategies for a query.

MRR represents the average "goodness" of retrieving relevant documents. This evaluation metric is used in information retrieval (IR), which measures the average reciprocal of the ranks at which the first relevant documents are retrieved for a set of queries. A higher MRR indicates better retrieval performance, as documents closer to the top of the ranked list are considered more relevant.

DCG is a measure of ranking quality in information retrieval. It is often normalized so that it is comparable across queries, giving Normalized DCG (NDCG or nDCG). NDCG measures the ranking quality, considering both the relevance and position of retrieved documents. Higher NDCG indicates a better-ranked list, where highly relevant documents appear at the top.

As shown in FIG. 1, a retrieval optimization system 150 may be used to supplement and improve robustness of the RAG retrieval process. Systems and methods described herein optimize MRR, DCG and/or NDCG in retrieval augmentation. The search optimization methods used by retrieval optimization system 150 are inspired by natural selection, in that they simulate the process of evolution to find optimal solutions in a search space.

Figure 2:
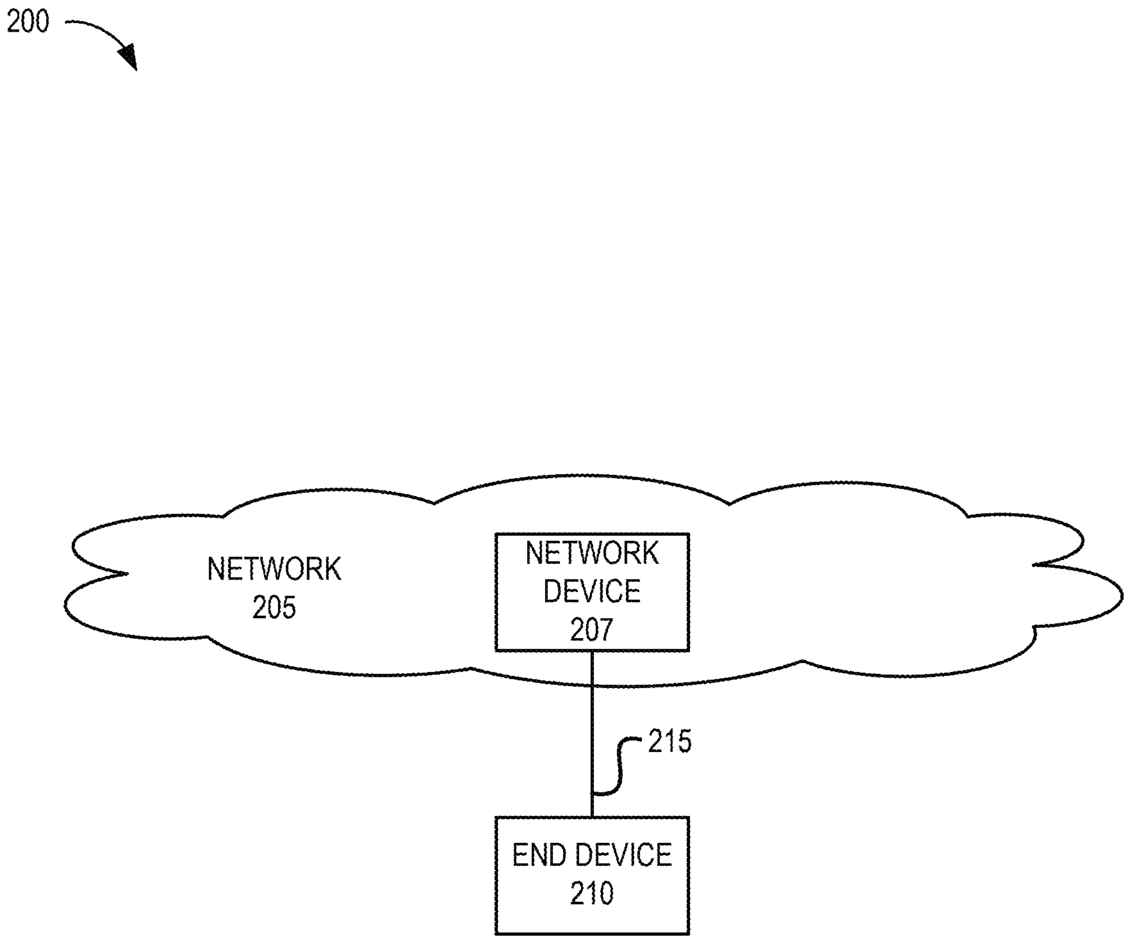
FIG. 2 is a diagram illustrating an exemplary environment 200 in which an exemplary embodiment of the retrieval optimization system may be implemented.

FIG. 2 is a diagram illustrating an exemplary environment 200 in which an exemplary embodiment of the retrieval optimization system may be implemented. As illustrated, environment 200 may include a network 205. Network 205 may include a network device 207. Environment 200 may include an end device 210.

Environment 200 may include a communication link 215 between network 205 and network device 207 and/or between end device 210 and network 205 and/or network device 207. A communicative connection via communication link 215 may be direct or indirect. For example, an indirect communicative connection may involve an intermediary device and/or an intermediary network not illustrated in FIG. 2. A direct communicative connection may not involve an intermediary device and/or an intermediary network. The number and arrangement of communication link 215 illustrated in environment 200 are exemplary. Communication link 215 may be wired, wireless, and/or optical.

Network 205 may include one or multiple networks of one or multiple types and/or technologies. For example, network 205 may include a wireless network, a wired network, and/or an optical network. Network 205 may be implemented to include a local area network (LAN), a radio access network (RAN), a core network, a service provider network, a customer service network, an enterprise network, the Internet, a private network, a network operations center network, and/or another type of network that may support access to and/or use of the retrieval optimization system.

Network device 207 may include a network device that provides retrieval optimization system 150, as described herein. In other implementations, network device 207 may include a RAG system to support an LLM, the LLM itself, and retrieval optimization system 150. For example, network device 207 may include a component that provides a function, a step, a process, and/or a service of retrieval optimization system 150, as described herein. Network device 207 may include other logic that provides a function, a step, a process, and/or a service of retrieval optimization system, 150 as described herein. Network device 207 is also described further below.

End device 210 may include a device that enables a user to communicate and use the retrieval optimization system. For example, end device 210 may enable a user to generate a user query (e.g., a natural language query for a chatbot) and communicate the user query to network device 207. According to various exemplary embodiments, end device 210 may be implemented as a mobile device, a portable device, a stationary device (e.g., a non-mobile device and/or a non-portable device), or another type of device operable by a user. End device 210 may include various types of software (e.g., browsers, clients, chat bots, messaging applications, web applications or communicators, application programming interfaces (APIs), or the like) and/or other types of user interfaces (e.g., a microphone, voice to text, speech to text, graphical user interfaces (GUIs), or the like) that may receive the user query from the user. End device 210 is described further below. For purposes of description, end device 210 is not considered a network device. Additionally, in the context of a service desk or a product support system, end device 210 may or may not be the device to which the issue or query is directed. For example, according to an exemplary scenario, a printer may be the device that has a problem, but a user may access and use the retrieval optimization system via a computer. Alternatively, according to other exemplary scenarios, end device 210 may be the device to which the issue or the query is directed and the device that a user may access and use the retrieval optimization system.

Communication link 215 may include a wireless, a wired, and/or an optical link. Communication link 215 may support a communicative connection, a communication session, exchange of data, and the like.

According to other embodiments, environment 200 may include additional networks and/or different types of networks than those illustrated and described herein. The number and arrangement of network device 207 in network 205, and the number of end device 210 are exemplary. A network device, such as network device 207 may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc.).

Figure 3:
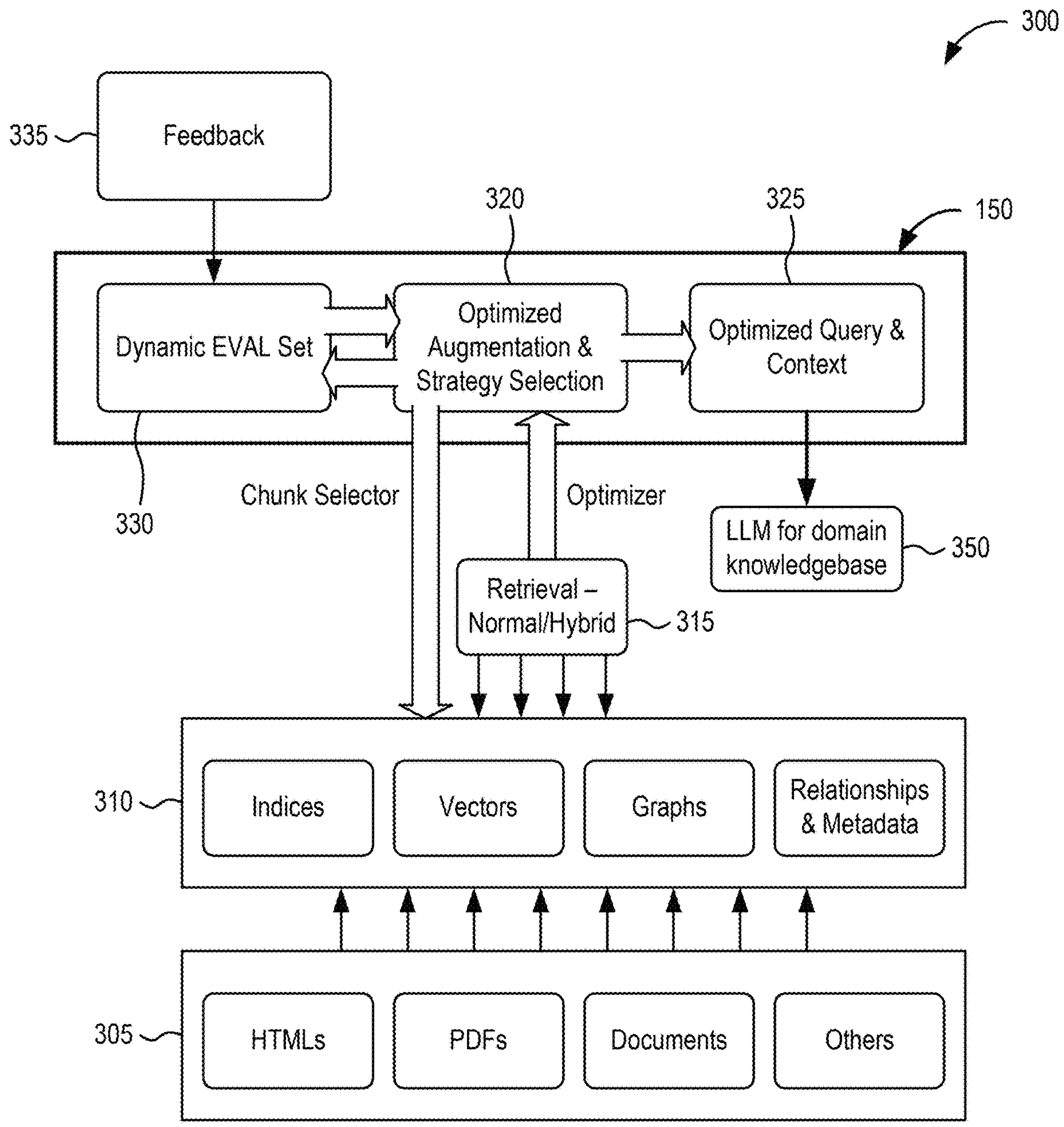
FIG. 3 is a diagram illustrating the retrieval optimization system within the context of a of Retrieval-Augmented Generation (RAG) environment, according to an implementation.

FIG. 3 is a diagram illustrating the retrieval optimization system within the context of a RAG environment 300, according to an implementation. RAG environment 300 may include raw knowledge sources 305 and retrieval-ready knowledge sources 310. Raw knowledge sources 305 may include individual web pages, documents, files, and the like included in the knowledge base of an enterprise (e.g., technical support documentation, chat sessions, user manuals, frequently asked questions, reports, white papers, etc.). The raw knowledge sources 305 may be processed to compile indexes, vectors, graphs, and/or relationships of individual sources to form retrieval-ready knowledge sources 310. Data in retrieval-ready knowledge sources 310 may be stored, for example, in a chunked format and retrieved as a set of chunks.

In response to a user query, such as a natural language query to a chatbot, a retrieval process 315 may be used to select an initial set of retrieval strategies. Any of multiple retrieval strategies may be used in retrieval process 315 to select a data set from retrieval-ready knowledge sources 310 under RAG processes. The retrieval process 315 may form an initial data set of retrieval strategies. Retrieval optimization system 150 may perform optimized augmentation and strategy selection 320 of the initial data set generated by retrieval process 315. Retrieval optimization system 150 may use an optimization criteria, such as MRR, DCG and/or NDCG metrics, to provide a quantifiable score for a selected retrieval strategy.

Based on the scoring, retrieval optimization system 150 may provide an optimized query and context 325 that may be used by to generate a response to the original user query. The optimized query and context 325 may include selections and strategy augmentations described, for example, in connection with FIGS. 4 and 5. The optimized query and context 325 may be provided, for example, to an LLM 350 for the domain knowledgebase, which may generate a response to the original query.

As described further herein, results of the optimized augmentation and strategy selection 320 may also be submitted to a dynamic evaluation set 330. Dynamic evaluation set 330 may include evaluation metrics and criteria to monitor and assess the performance of retrieval optimization system 150. Dynamic evaluation set 330 may assess the selected output strategies in a dynamic and flexible manner, rather than relying on fixed, pre-defined metrics. According to an implementation, the dynamic evaluation set 330 may include the highest scoring selections (e.g., "major" strategies), which is used to respond to the original user query, along with unselected strategy candidates (e.g., "minor" strategies), which may be evaluated for potential contribution to the overall output efficacy. For example, feedback 335 may be in the form of actual user feedback (e.g. implicit or explicit) for major strategies and candidate model feedback (e.g., calculated relevance scores) for both major and minor strategies.

Although FIG. 3 shows exemplary components of environment 300, in other implementations, environment 300 may include fewer components, different components, differently arranged components, or additional components than depicted in FIG. 3. Additionally, or alternatively, one or more components of environment 300 may perform functions described as being performed by one or more other components of environment 300.

Figure 4:
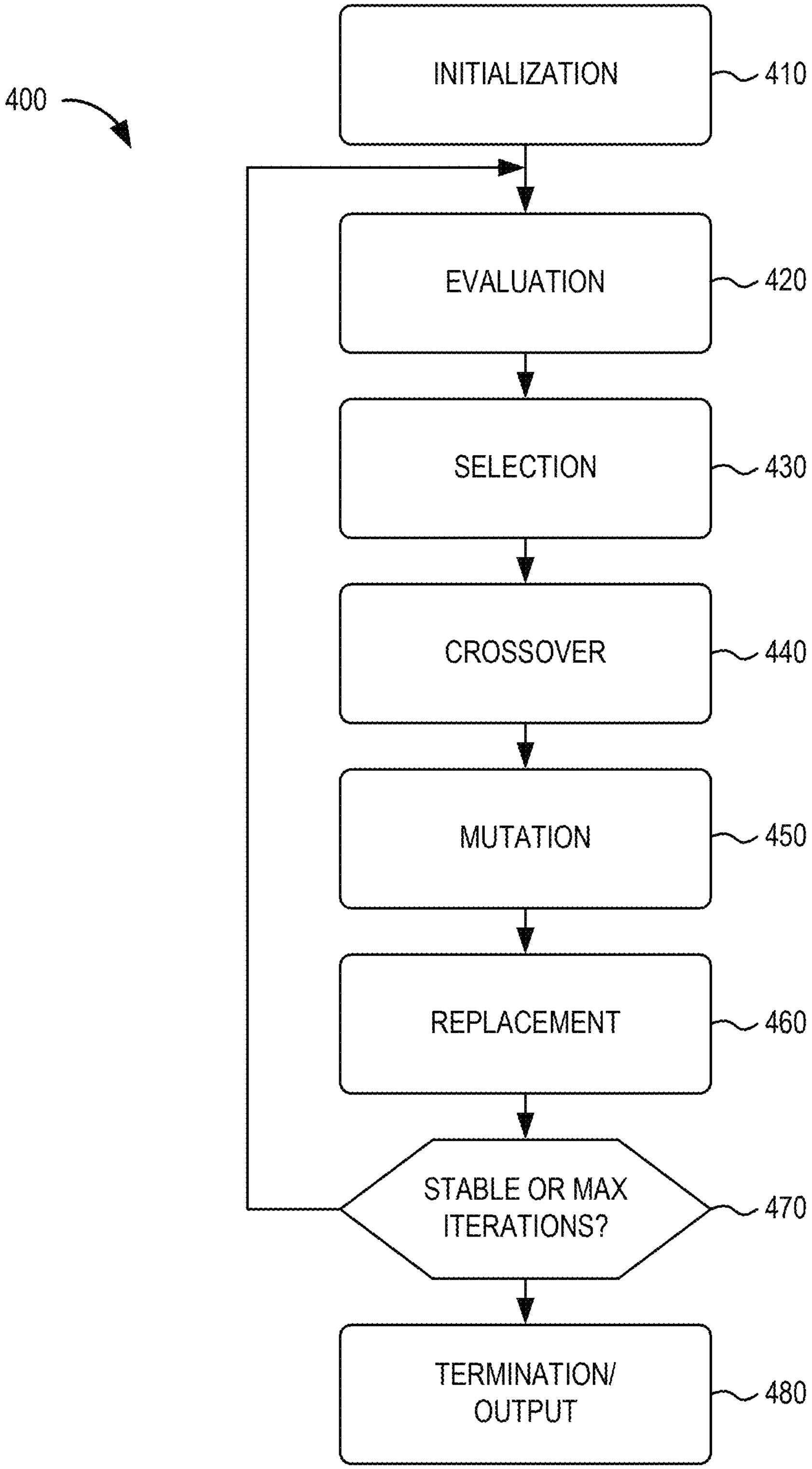
FIG. 4 is a process flow for a genetic algorithm variant that may be applied in the retrieval optimization system to perform optimized augmentation and strategy selection.
Figure 5:
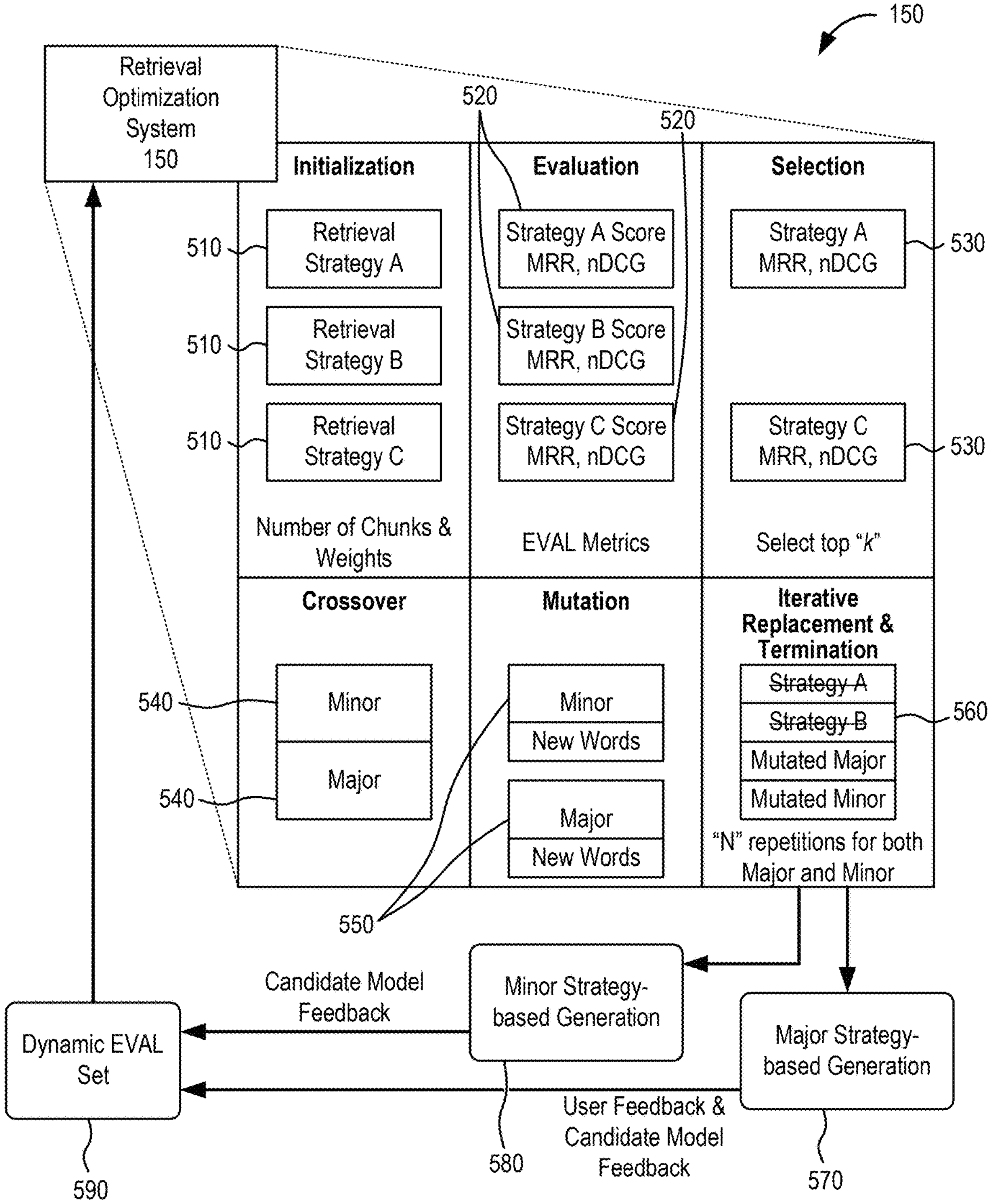
FIG. 5 is a block diagram illustrating implementation of an optimized augmentation and strategy selection process.

FIG. 4 illustrates a process flow 400 for a genetic algorithm variant that may be applied in the retrieval optimization system 150 to perform optimized augmentation and strategy selection 320, according to an implementation. Process 400 may be performed, for example, by network device 207. As shown in FIG. 4, process flow 400 may include initialization 410, evaluation 420, selection 430, crossover 440, mutation 450, replacement 460, and termination 480. FIG. 5 is a block diagram illustrating implementation of an optimized augmentation and strategy selection process. Blocks of process 400 may be described in the context of FIG. 5.

Initialization 410 may create a population of individual candidate augmented queries. Each strategy may have parameters, such as the number of chunks to retrieve from each corpus and the weights assigned to each corpus. Each individual candidate may be a string representing an original query (e.g., "Why is my internet slow?") with potential augmentation terms related to network issues (e.g., "internet outage," "connection problem," "slow loading," etc.). Initialization 410 may be provided, for example, as part of retrieval process 315. As shown in FIG. 5, initialization 410 may provide a group of candidates. Three candidates 510 (e.g., "Retrieval Strategy A," "Retrieval Strategy B," "Retrieval Strategy C") are shown in FIG. 5 for simplicity. In other implementations, more candidates (e.g., 5, 10, 25 candidates) may be included in initialization 410.

Evaluation 420 may assign a fitness score to each individual candidate based on a combination of MRR and NDCG calculated using a validation set of queries and documents related to network documents retrieval. For each strategy, retrieval optimization system 150 may apply the parameters to retrieve chunks for a set of queries. Retrieval optimization system 150 may calculate MRR and NDCG for each query based on the relevance of the retrieved chunks. A weighted combination (e.g., w*MRR+(1−w)*NDCG)) or other aggregation methods can be used for the fitness score, where w is a weight between 0 and 1 that prioritizes either MRR or NDCG. As shown in FIG. 5, evaluation 420 may assign a fitness score 520 (e.g., "Strategy A Score," "Strategy B Score," "Strategy C Score") for each of candidates 510. The fitness score of each offspring individual candidate may be evaluated using the validation set and the combined MRR and NDCG calculation from the below formulae:

MRR measures the rank of the first relevant document. For a single query q:

$$MRR(q) = \frac{1}{\text{rank}_q} \quad (1)$$

where rank_q is the rank of the first relevant document for a query at q. For multiple queries Q:

$$MRR(Q) = \frac{1}{|Q|}\sum_{q\in Q}\frac{1}{\text{rank}_q} \quad (2)$$

DCG measures the relevance of retrieved documents, considering their positions. For a list of retrieved documents {d_1, d_2, . . . , d_n}:

$$DCG_p = \sum_{i=1}^{p}\frac{2^{rel_i}-1}{\log_2(\text{rank}_i+1)} \quad (3)$$

where rel_i is the relevance score of the document at position i.

NDCG normalizes DCG by the ideal DCG (iDCG), which is the DCG of the perfect ranking. For a list of retrieved documents:

$$nDCG_p = \frac{DCG_p}{iDCG_p} \quad (4)$$

where iDCG is the DCG for the ideal ordering of the relevant documents up to position p. The relevance score rel_i of a document i retrieved for a query can be computed using various methods, such as:

$$rel_i = \frac{\text{similarity}(d_i, q)}{\text{max\_similarity}(D, q)} \quad (5)$$

where similarity(d_i, q) is a measure of similarity between document d_i and query q, and where {max_similarity}(D, q) is the maximum similarity score among all documents in corpus D with respect to query q.

Similarity may be calculated in terms of Term Frequency-Inverse Document Frequency (TF-IDF), which captures the importance of a term in a document relative to the entire document collection.

$$TF\text{-}IDF(t, d) = (TF(t, d) * \log(N / DF(t))) \quad (6)$$

where TF(t, d): Term frequency (count of term 't' in document 'd'),

DF(t): Document frequency (number of documents containing term 't'), and

N: Total number of documents in the collection,

Document length may be the length of the document in number of words (e.g., word count). Thus, the linear regression (LR) model can be represented as:

$$\hat{y}_i = w_0 + w_1 \times \text{Word Count}_i + w_2 \times TF\text{-}IDF\ \text{Score}_i \quad (7)$$

The LR model aims to learn the coefficients w_0, w_1 and w_2 that minimize the difference between predicted and actual relevance scores.

Still referring to FIG. 4, selection 430 may include selecting a subset of individual strategies from the population for reproduction based on their fitness scores. In one implementation the fitness score may be the weighted sum of each strategy's MRR and NDCG scores. In other implementation, the selection process may consider both MRR and NDCG metrics to decide which strategy to keep. The probability of selection is typically proportional to the fitness score, but other selection methods like tournament selection or roulette wheel selection can be used in other implementations. As shown in FIG. 5, selection 430 may include selection of a top k candidates (where k is at least 2). In the example, of FIG. 5, assume "Strategy A" and "Strategy C" are the k parent selections 530 on the basis of having higher fitness scores than "Strategy B."

Crossover 440 may include combining the parameters (e.g., terms) of two parent individuals to create new offspring (e.g., augmented queries). Common crossover operators may include single-point crossover or two-point crossover. In the example of FIG. 5, crossovers 540 are derived from selected "Strategy A" and "Strategy B." The crossovers 540 may be identified as major and a minor. A major individual may be the higher scoring strategy with one term from the lower scoring strategy. Conversely, a minor individual may be the lower scoring selected strategy with one term from the higher scoring strategy.

Mutation 450 may introduce changes (e.g., mutations) to the offspring's genetic material with a low probability. Mutations can involve, for example, adding, removing, or substituting terms. Mutation 450 may introduce small random or semi-random changes to the new crossover strategies to explore a broader search space. In one implementation, mutations may include synonyms or alternative expressions for terms in a domain. In other implementations, mutations may include introducing typographical errors, grammatical variations (e.g., gerunds, plurals, etc.), and the like. In the example of FIG. 5, both the major crossover and the minor crossover may use alternative terms for the crossover set (e.g., replace "slow" with "lagging" or "sluggish" or "delay") to form mutated offspring 550.

Iterative replacement 460 may include replacing a portion of lower-scoring individuals in the population with the newly evaluated offspring. In the example of FIG. 5, a new population may be formed by combining the parent selections 530 and the mutated offspring 550.

As indicated at process block 470, process 400 may continue for a predefined number of generations or until a stopping criterion (e.g., reaching a desired fitness threshold) is reached. For example, in the example of FIG. 5, the two parent selections 530 and the two mutated offspring 550 may be evaluated as a new population 560, with strategy scores calculated for the two mutated offspring 550. The top k (two) strategies may be selected from population 560, with crossover and mutation then performed for the newly selected strategies. Iterations may be performed until a stopping criterion is reached, such as a set number (n) of repetitions, until a satisfactory solution score is achieved, or until no further improvements are achieved.

Termination and output (480) may indicate a stopping point for process 400 with an output of a major strategy for responding to the user query and both major and minor strategies for the dynamic evaluation set. For example, as shown in FIG. 5, retrieval optimization system 150 may provide as output (e.g., to an LLM 350) a major based strategy 570 from population 560 and/or a minor strategy-based generation 580.

By the end of process 400, the genetic algorithm will have optimized the retrieval parameters, resulting in better MRR and NDCG scores for the RAG system. The genetic algorithm may evolve a population of augmented queries that effectively retrieve relevant documents across and within a corps, leading to an improved overall output by extending the evaluation of NDCG method for output correctness, which is often used to measure effectiveness of the generated output using RAG.

Referring again to FIG. 5, after identification of a highest-scoring strategy (referred to as a major strategy) and one or more next-highest-scoring strategy (referred to as a minor strategy), retrieval optimization system 150 may forward the highest-scoring query of the selected query set to use by a generative AI system (e.g., LLM 350) in responding to the initial query. For example, major strategy-based generation 570 may be a query response that is provided to a user or consumer. The major strategy-based generation 570 may receive user feedback (e.g., explicit or implicit feedback). The major strategy-based generation 570, along with the user feedback and candidate model feedback (e.g., the MRR and NDCG scores for the query), may be provided to a dynamic evaluation set 590 for further learning. In contrast, minor strategy-based generation 580 may not be provided to a user. However, the minor strategy-based generation 580 may also be provided to the dynamic evaluation set 590, along with candidate model feedback (e.g., the MRR and NDCG scores for the query).

FIGS. 4 and 5 refer to non-limiting examples of retrieval optimization system 150 in connection with customer service inquiries to a service provider. In other implementations, retrieval optimization system 150 may be applied to network management, such as troubleshooting of network elements (e.g., in network 205) and/or network services. For example, retrieval optimization system 150 may be incorporated with a RAG system that has raw knowledge sources 305 and retrieval-ready knowledge sources 310 of knowledge bases related to network equipment for different vendors, different network functions, network slicing, network APIs, network orchestration, etc. In one implementation, raw vendor-specific documents (e.g., raw knowledge sources 305) may be converted into a multi-vector store (e.g., retrieval-ready knowledge sources 310). In such a context, a major strategy-based generation 570 may be used, for example, by a LLM for network troubleshooting. In one implementation, strategies from retrieval optimization system 150 may be used by the LLM/AI agent to generate recommendations and/or actions for automated network troubleshooting and/or configuration changes. In one implementation, an automated process, such as a robotic process automation (RPA), may perform a troubleshooting action on the vendor equipment based on major strategy-based generation 570.

Figure 6:
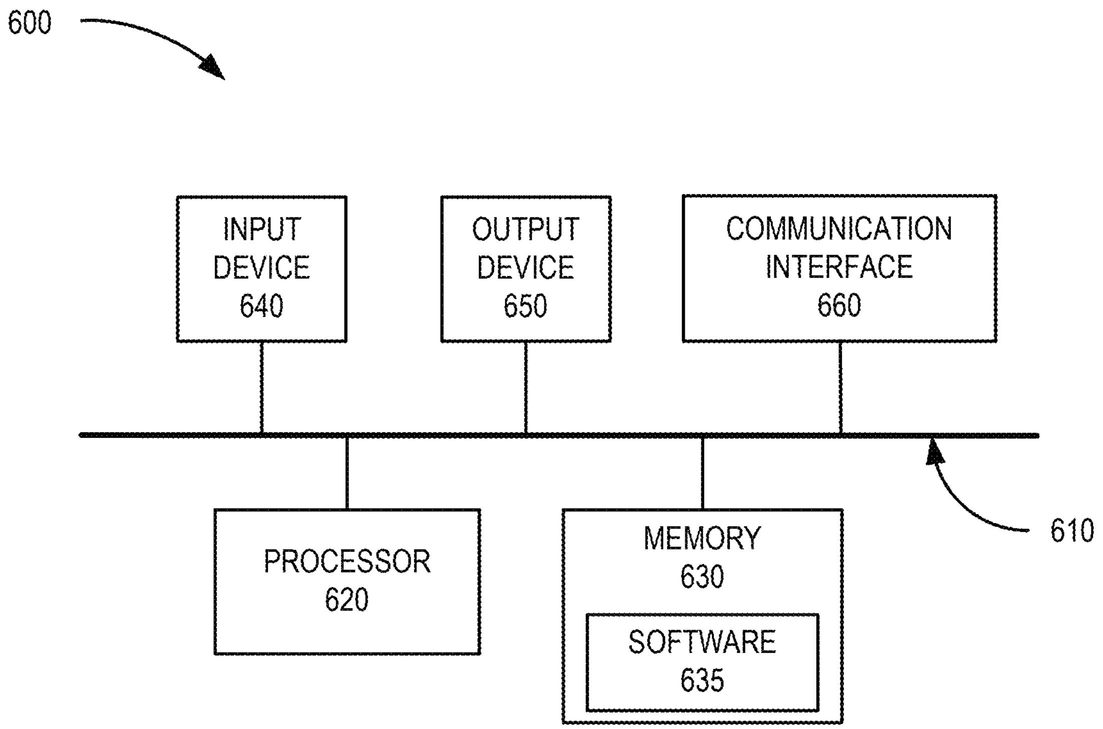
FIG. 6 is a diagram illustrating exemplary components of a device according to an implementation described herein.

FIG. 6 is a diagram illustrating exemplary components of a device 600 according to an implementation described herein. Components of retrieval optimization system 150, network device 207, end device 210, or other components may each include one or more devices 600. As shown in FIG. 6, device 600 may include a bus 610, a processor 620, a memory 630 with software 635, an input device 640, an output device 650, and a communication interface 660.

Bus 610 may include a path that permits communication among the components of device 600. Processor 620 may include any type of single-core processor, multi-core processor, microprocessor, latch-based processor, and/or processing logic (or families of processors, microprocessors, and/or processing logics) that interprets and executes instructions. For example, processor 620 may include one or more Central Processing Units (CPUs) and/or one or more Graphics Processing Units (GPU). In other embodiments, processor 620 may include an application-specific integrated circuit (ASIC), a field-programmable gate array (FPGA), and/or another type of integrated circuit or processing logic. Processor 620 may control operation of device 600 and its components.

Memory 630 may include any type of dynamic storage device that may store information and/or instructions, for execution by processor 620, and/or any type of non-volatile storage device that may store information for use by processor 620. For example, memory 630 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 635 includes an application or a program that provides a function and/or a process. Software 635 may also include firmware, middleware, microcode, hardware description language (HDL), and/or other form of instruction. By way of example, with respect retrieval optimization system 150, functional elements of retrieval optimization system 150 may include software 635 to perform tasks as described herein.

Input device 640 may allow an operator to input information into device 600 and/or to collect information from the environment using one or more sensors. Input device 640 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 600 may be managed remotely and may not include input device 640.

Output device 650 may output information to an operator of device 600 and/or to control device 600 and/or the environment using one or more actuators. Output device 650 may include a display, a printer, a speaker, an actuator to cause device 600 to vibrate, a motor to cause part of device 600 to move, a lock device, and/or another type of output device. For example, device 600 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 600 may be managed remotely and may not include output device 650.

Communication interface 660 may include a transceiver that enables device 600 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to RF signals and/or a receiver that converts RF signals to baseband signals. Communication interface 660 may be coupled to an antenna for transmitting and receiving RF signals. For example, if device 600 is included in end device 210, communication interface 660 may include an antenna assembly that includes one or more antennas to transmit and/or receive RF signals.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a Wi-Fi™) card for wireless communications. Communication interface 660 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 600 may perform certain operations relating to graphical network design and configuration tools. Device 600 may perform these operations in response to processor 620 executing software instructions (e.g., software 635) contained in a computer-readable storage medium, such as memory 630. A computer-readable storage medium may be defined as a non-transitory memory device. A memory device may be implemented within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of device 600, in other implementations, device 600 may include fewer components, different components, additional components, or differently arranged components than depicted in FIG. 6. Additionally, or alternatively, one or more components of device 600 may perform one or more tasks described as being performed by one or more other components of device 600.

Figure 7:
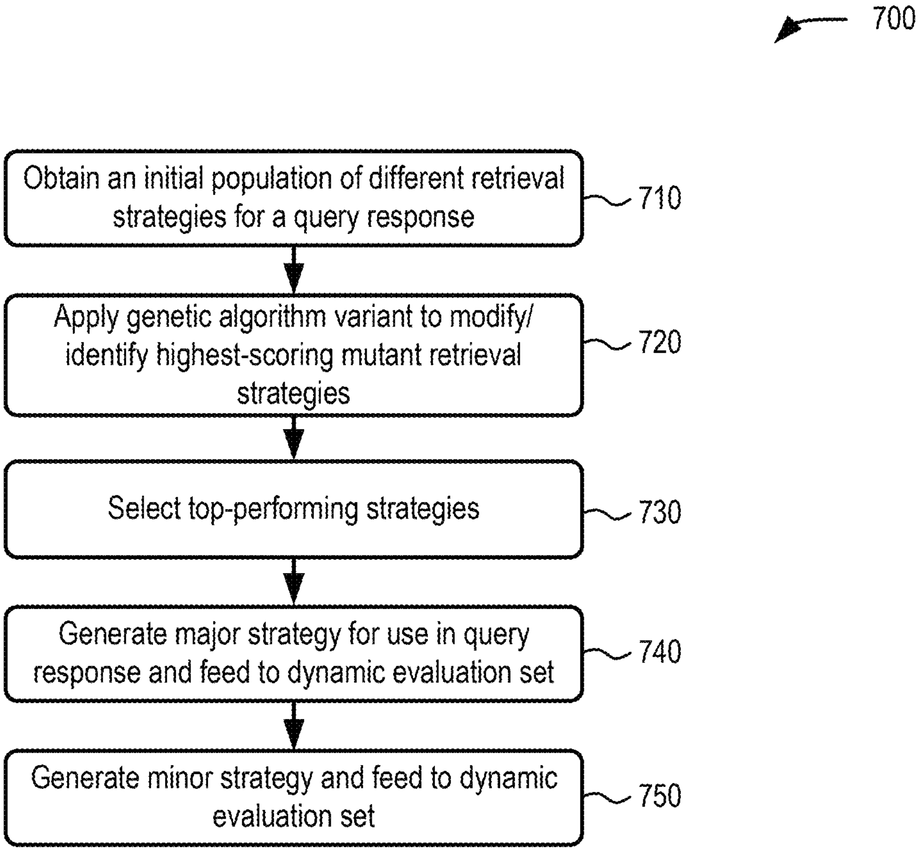
FIG. 7 is a flow diagram illustrating an exemplary process for providing optimized content retrieval for AI bots, according to an implementation described herein.

FIG. 7 is a flow diagram illustrating an exemplary process 700 for providing optimized content retrieval for AI bots, according to an implementation described herein. In one implementation, process 700 may be implemented by retrieval optimization system 150.

Referring to FIG. 7, process 700 may include obtaining an initial population of different retrieval strategies (block 710). For example, in response to a user query, a RAG system may identify an initial query and one or more augmentations for the initial query, such as an augmented query string.

Process 700 may further include applying a genetic algorithm variant to modify and/or identify highest-scoring retrieval strategies (block 720) and selecting the highest-scoring retrieval strategies (block 730). For example, as described above in connection with FIGS. 4 and 5, retrieval optimization system 150 may conduct a variant of the genetic algorithm to evaluate fitness of each retrieval strategies based on, for example, the relevance of retrieved documents for each query (e.g., an MRR and NDCG score). The genetic algorithm variant may select a highest-scoring query set as a parent population, perform crossover (recombination) of terms from the selected queries to create new augmented queries. Mutations may be introduced into the augmented queries to help maintain diversity and prevent the algorithm from getting stuck in local optima. The mutated queries may be combined with the parent population to form a new population. The new population may be evaluated based on the same relevance criteria (e.g., MRR and NDCG scores), and the selection, crossover, and mutations may be repeated to identify an optimal query set (e.g., with the best MRR and NDCG scores), which may be selected for the use in the query response.

Generating a major retrieval strategy for use in the query response and feeding the major retrieval strategy to a dynamic evaluation set (block 740). For example, retrieval optimization system 150 may forward the highest-scoring query of the selected query set to use in responding to the initial query. The selected highest-scoring query may be indicated as the major strategy and provided to a dynamic evaluation set. The major strategy may include, for example, the base question or query, the augmented question, the highest-scoring query along with any user feedback or candidate model feedback related to the query response.

Generating a minor retrieval strategy and feeding the minor retrieval strategy to a dynamic evaluation set (block 750). For example, retrieval optimization system 150 may not use the next-highest-scoring query of the selected query set to respond to the initial query. The unselected query or queries may be indicated as the minor strategy and provided to a dynamic evaluation set. The minor strategy may include, for example, the base question or query, the augmented question, the unselected query along with any candidate model feedback.

Figure 8:
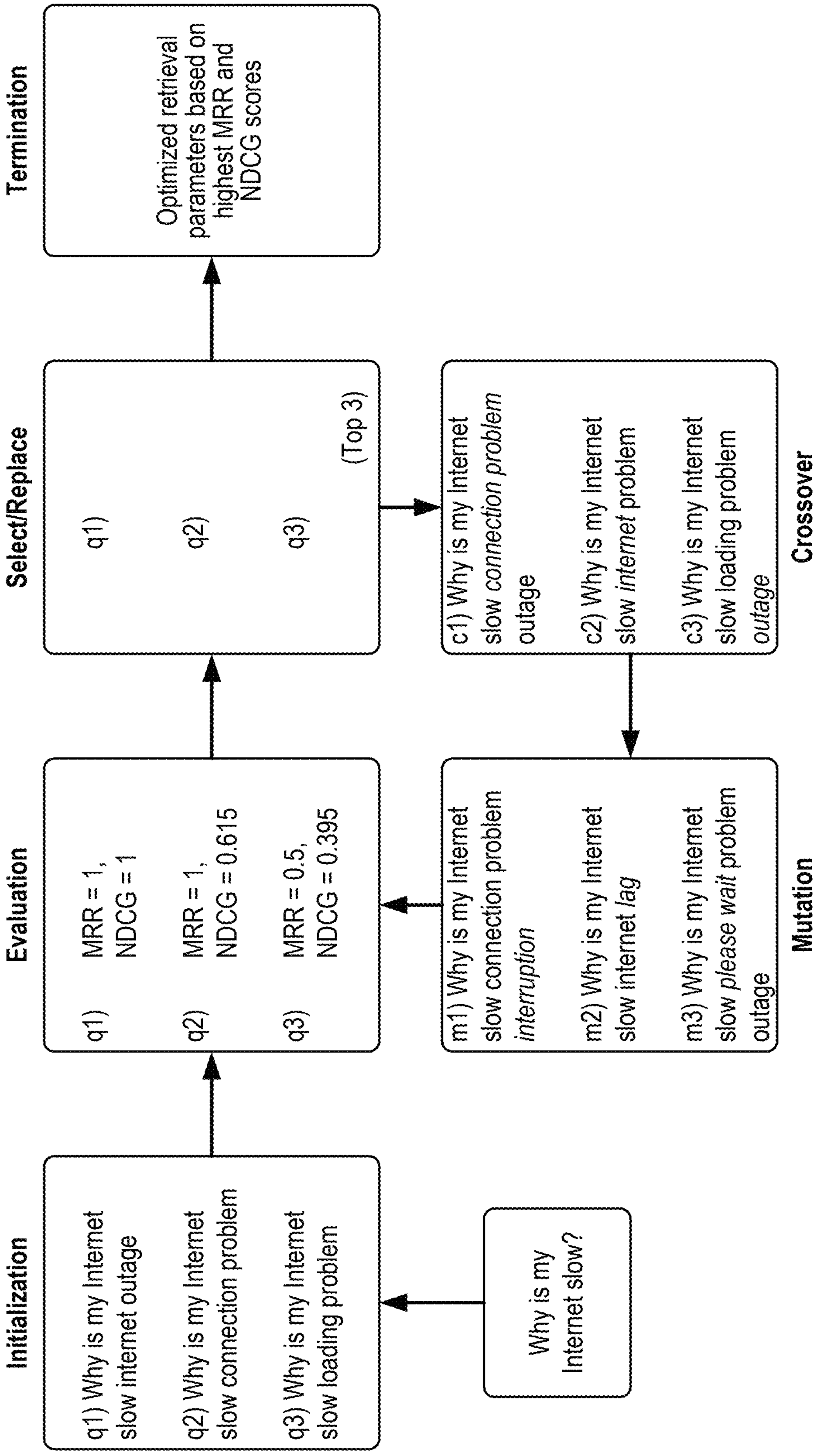
FIG. 8 illustrates a use case of a retrieval augmentation system for a customer support chatbot, according to an implementation.

FIG. 8 illustrates a use case of a retrieval augmentation system for a customer support chatbot. The retrieval augmentation system may retrieve relevant documents from multiple internal knowledge bases to assist customer service agents in responding to queries. Assume a customer service agent receives a query about troubleshooting a network issue, particularly: "Why is my internet slow?"

As an initialization step, the initial query may be augmented with potential augmentation terms to form a set (Q) of three queries, namely, q1: "Why is my internet slow internet outage," q2: "Why is my internet slow connection problem," and q3: "Why is my internet slow loading problem." The initialization step creates an initial population of different retrieval strategies. Each strategy has parameters such as the number of chunks to retrieve from each corpus and the weights assigned to each corpus.

In the evaluation step, for each strategy, the parameters are applied to retrieve chunks for the set of queries. MRR and NDCG may be calculated for each query based on the relevance of the retrieved chunks. Assume, for the set of queries Q={q1, q2, q3}, each query may retrieve a set of four relevant documents from a group of five documents, with TF-IDF scores as indicated in the table below.

| Doc | Word Count | TF-IDF Score |
|---|---|---|
| 1 | 100 | 0.5 |
| 2 | 200 | 0.3 |
| 3 | 150 | 0.8 |
| 4 | 120 | 0.6 |
| 5 | 180 | 0.4 |

Using the LR formula (equation (7) above), relevance scores may be calculated for each query q1, q2, q3. Assume, each retrieval strategy, retrieves a set of four documents with relevance scores (e.g. derived using equation (5) above) as follows:

Query q1 retrieves documents [d_3, d_1, d_4, d_2] with relevance scores [3, 2, 1, 0].

Query q2 retrieves documents [d_1, d_4, d_2, d_3] with relevance scores [2, 1, 0, 3].

Query q3 retrieves documents [d_2, d_3, d_1, d_4] with relevance scores [0, 3, 2, 1].

MRR may be calculated for each query as follows:

For q1:

First relevant document is d_3 at rank 1: {MRR} q1=1/1=1

For q2:

First relevant document is d_1 at rank 1: {MRR} q2=1/1=1

For q3:

First relevant document is d_3 at rank 2: {MRR} q3=½=0.5

Thus, the average MRR for the set of queries Q is:

$$MRR(Q) = \frac{1}{3}(1 + 1 + 0.5) = \frac{2.5}{3} = 0.833$$

DCG may be calculated for each query as follows:

For $q1$:

$$DCG_4 = \frac{2^3-1}{\log_2(1+1)} + \frac{2^2-1}{\log_2(2+1)} + \frac{2^1-1}{\log_2(3+1)} = 7 + 1.89 + 0.5 = 9.39$$

For $q2$:

$$DCG_4 = \frac{2^2-1}{\log_2(1+1)} + \frac{2^1-1}{\log_2(2+1)} + \frac{2^3-1}{\log_2(4+1)} = 3 + 0.63 + 2.15 = 5.78$$

For $q3$:

$$DCG_4 = \frac{2^3-1}{\log_2(2+1)} + \frac{2^2-1}{\log_2(3+1)} + \frac{2^1-1}{\log_2(4+1)} = 1.89 + 1.5 + 0.32 = 3.71$$

iDCG may be calculated for each query as follows:

For $q1$:

$$iDCG_4 = \frac{2^3-1}{\log_2(1+1)} + \frac{2^2-1}{\log_2(2+1)} + \frac{2^1-1}{\log_2(3+1)} + \frac{2^0-1}{\log_2(4+1)} = 7 + 1.89 + 0.5 + 0 = 9.39$$

For $q2$:

$$iDCG_4 = \frac{2^3-1}{\log_2(1+1)} + \frac{2^2-1}{\log_2(2+1)} + \frac{2^1-1}{\log_2(3+1)} + \frac{2^0-1}{\log_2(4+1)} = 7 + 1.89 + 0.5 + 0 = 9.39$$

For $q3$:

$$iDCG_4 = \frac{2^3-1}{\log_2(1+1)} + \frac{2^2-1}{\log_2(2+1)} + \frac{2^1-1}{\log_2(3+1)} + \frac{2^0-1}{\log_2(4+1)} = 7 + 1.89 + 0.5 + 0 = 9.39$$

NDCG may be calculated for each query as follows:

For $q1$:

$$nDCG_4 = \frac{9.39}{9.39} = 1$$

For $q2$:

$$nDCG_4 = \frac{5.78}{9.39} \approx 0.615$$

For $q3$:

$$nDCG_4 = \frac{3.71}{9.39} \approx 0.395$$

Thus, the average NDCG for the set of queries Q is:

$$nDCG(Q) = \frac{1 + 0.615 + 0.395}{3} \approx 0.67$$

By iteratively optimizing the parameters using a genetic algorithm, the retrieval process in the RAG system can be fine-tuned to maximize the relevance and ranking of the retrieved chunks, leading to better-generated responses. In the selection step, the top-performing strategies may be selected based on a weighted sum of their MRR and NDCG scores. For instance, if Strategy A has an MRR of 0.8 and an NDCG of 0.9, while Strategy B has an MRR of 0.7 and an NDCG of 0.95, the selection process will consider both metrics to decide which strategy to keep. In the example of FIG. 8, three (e.g., q1, q2, and q3) may be initially selected.

In the crossover step, the parameters of the selected strategies may be combined to create new ones. For example, if Strategy A's parameters are [0.5, 0.3, 0.2] and Strategy B's are [0.4, 0.4, 0.2], a single-point crossover might produce [0.5, 0.4, 0.2] as a crossover. As shown in FIG. 8, a crossover c1, formed from a single-point crossover of q1 and q2, may be reflected as "Why is my Internet slow connection problem outage." In other implementations, a two-point crossover may be used between the selected strategies.

In the mutation step, small random or semi-random changes may be introduced to the new strategies to explore a broader search space. For example, changing a parameter from 0.5 to 0.55. In the example of FIG. 8, a mutation m1, formed from c1, may be reflected as "Why is my Internet slow connection problem interruption."

The evaluation, selection, crossover, and mutation steps may be repeated for a set number of generations or until the performance stabilizes. Upon termination of these steps the retrieval optimization system 150 may use the optimized retrieval parameters based on highest MRR and NDCG scores.

Systems and methods described herein improve accuracy for retrieving relevant content from a domain knowledgebase. Particularly, the systems and methods may provide improved RAG accuracy. According to an implementation, a network device may obtain, in response to a query, an initial population of retrieval strategies for retrieving relevant content from the domain knowledgebase. The network device may retrieve first documents from the domain knowledgebase based on each retrieval strategy and selects first top-performing strategies from the initial population based on scoring of the retrieved first documents. The network device may generate an updated population including the first top-performing strategies and mutant retrieval strategies derived from the selected first top-performing strategies and may retrieve second documents from the domain knowledgebase based on each retrieval strategy of the retrieval strategies. The network device may select second top-performing strategies from the updated population based on a scoring of the retrieved second documents and may provide the one of the second top-performing strategies to a LLM for responding to the query.

The systems and methods described herein do not require additional infrastructure and can be interfaced as plug and play module with existing apps (e.g., chat bots). The systems and methods are also scalable across domains. The systems and methods may reduce the overall number of LLM calls made for a solution, which may provide significant of cost and compute savings.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of communications and blocks have been described with regard to the processes illustrated in FIGS. 4, 5, 7, and 8, the order of the communications and blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 620, etc.), or a combination of hardware and software (e.g., software 635). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 620) of a computational device. A non-transitory storage medium includes one or more of the storage mediums described in relation to memory 630.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:

obtaining, by a computing device and in response to a query, an initial population of retrieval strategies for retrieving relevant content from a domain knowledgebase;

retrieving, by the computing device, first documents from the domain knowledgebase based on each retrieval strategy of the retrieval strategies;

selecting, by the computing device, first top-performing strategies from the initial population based on scoring of the retrieved first documents relative to the query;

generating, by the computing device, an updated population of retrieval strategies including the first top-performing strategies and mutant retrieval strategies derived from the selected first top-performing strategies;

retrieving, by the computing device, second documents from the domain knowledgebase based on each retrieval strategy of the updated population of retrieval strategies;

replacing, by the computing device, one or more first top-performing strategies with one or more second top-performing strategies from the updated population based on a scoring of the retrieved second documents relative to the query; and providing, by the computing device, one of the second top-performing strategies to a large language model (LLM) for responding to the query.

2. The method of claim 1, wherein selecting the first top-performing strategies includes:

generating a fitness score for each retrieval strategy based on the retrieved first documents from chunks in a retrieval-ready knowledge source; and selecting a set of strategies with the highest fitness scores.

3. The method of claim 2, wherein each fitness score includes a mean reciprocal rank (MRR) and a normalized discounted cumulative gain (NDCG) for the first documents associated with one of the retrieval strategies.

4. The method of claim 1, wherein replacing the one or more first top-performing strategies includes:

generating fitness scores for each mutant retrieval strategy based on the retrieved second documents; and selecting set of strategies from the updated population with the highest fitness scores.

5. The method of claim 1, wherein generating the updated population includes:

combining parameters of the first selected top-performing strategies to create crossover strategies.

6. The method of claim 5, wherein combining the parameters further includes:

introducing a single-point crossover or a two-point crossover between two of the first selected top-performing strategies.

7. The method of claim 5, wherein generating the updated population further includes:

introducing mutations to terms in the crossover strategies.

8. The method of claim 1, further comprising:

using a highest scored strategy of the second top-performing strategies to generate a response to the query;

collecting first candidate model feedback for highest scored strategy and user feedback from the response to the query; and providing the highest scored strategy, the user feedback, and the first candidate model feedback to a dynamic evaluation set.

9. The method of claim 8, further comprising:

collecting second candidate model feedback for a next-highest scored strategy of the second top-performing strategies; and providing the next-highest scored strategy and the second candidate model feedback to a dynamic evaluation set.

10. A network device, comprising:

one or more processors to:

obtain, in response to a query, an initial population of retrieval strategies for retrieving relevant content from a domain knowledgebase;

retrieve first documents from the domain knowledgebase based on each retrieval strategy of the retrieval strategies;

select first top-performing strategies from the initial population based on scoring of the retrieved first documents relative to the query;

generate an updated population of retrieval strategies including the first top-performing strategies and mutant retrieval strategies derived from the selected first top-performing strategies;

retrieve second documents from the domain knowledgebase based on each retrieval strategy of the updated population of retrieval strategies;

replace one or more first top performing strategies with one or more second top-performing strategies from the updated population based on a scoring of the retrieved second documents relative to the query; and provide one of the second top-performing strategies to a large language model (LLM) for responding to the query.

11. The network device of claim 10, wherein, when selecting the first top-performing strategies, the one or more processors are further to:

generate a fitness score for each retrieval strategy based on relevance of the retrieved first documents.

12. The network device of claim 11, wherein, when generating the fitness score, the one or more processors are further to:

calculate a mean reciprocal rank (MRR) and a normalized discounted cumulative gain (NDCG) for a portion of the first documents associated with each retrieval strategy.

13. The network device of claim 10, wherein, when replacing the one or more first top-performing strategies, the one or more processors are further to:

generate fitness scores for each mutant retrieval strategy based on the retrieved second documents; and selecting set of strategies from the updated population with the highest fitness scores.

14. The network device of claim 10, wherein, when generating the updated population, the one or more processors are further to:

combine parameters of the first selected top-performing strategies to create crossover strategies; and introduce mutations to one or more terms in the crossover strategies.

15. The network device of claim 10, wherein the one or more processors are further to:

use a highest scored strategy of the second top-performing strategies to generate a response to the query;

collect first candidate model feedback for highest scored strategy and user feedback from the response to the query; and provide the highest scored strategy, the user feedback, and the first candidate model feedback to a dynamic evaluation set.

16. The network device of claim 15, wherein the one or more processors are further to:

collect second candidate model feedback for a next-highest scored strategy of the second top-performing strategies; and provide the next-highest scored strategy and the second candidate model feedback to a dynamic evaluation set.

17. A non-transitory, computer-readable storage medium storing instructions executable by a processor of a computing device for:

obtaining, in response to a query, an initial population of retrieval strategies for retrieving relevant content from a domain knowledgebase;

retrieving first documents from the domain knowledgebase based on each retrieval strategy of the retrieval strategies;

selecting first top-performing strategies from the initial population based on scoring of the retrieved first documents relative to the query;

generating an updated population of retrieval strategies including the first top-performing strategies and mutant retrieval strategies derived from the selected first top-performing strategies;

retrieving second documents from the domain knowledgebase based on each retrieval strategy of the updated population of retrieval strategies;

replacing one or more first top-performing strategies with one or more second top-performing strategies from the updated population based on a scoring of the retrieved second documents relative to the query; and providing one of the second top-performing strategies to a large language model (LLM) for responding to the query.

18. The non-transitory, computer-readable storage medium of claim 17, wherein the instructions for selecting the first top-performing strategies further include instructions for:

generating a mean reciprocal rank (MRR) and a normalized discounted cumulative gain (NDCG) for each retrieval strategy based on the retrieved first documents.

19. The non-transitory, computer-readable storage medium of claim 17, wherein the instructions for replacing the one or more first top-performing strategies further include instructions for:

generating a mean reciprocal rank (MRR) and a normalized discounted cumulative gain (NDCG) for each retrieval strategy based on the retrieved second documents; and selecting set of strategies with highest weighted MRR and NDCG scores.

20. The non-transitory, computer-readable storage medium of claim 17, wherein the instructions for generating the updated population further include instructions for:

introducing a single-point crossover or a two-point crossover between two of the first selected top-performing strategies to form crossover strategies; and introducing mutations to parameters in the crossover strategies.

* * * * *